United States Patent
Akhmetov et al.

(10) Patent No.: US 12,022,516 B2
(45) Date of Patent: Jun. 25, 2024

(54) BEACON INTERVAL WITH BOUNDARY TIME POINTS (BTPs) TO IMPROVE LATENCY FOR TIME SENSITIVE TRAFFIC (TST) IN EXTREMELY HIGH THROUGHOUT (EHT) WLANS

(71) Applicant: Intel Corporation, Santa Clara, CA (US)

(72) Inventors: Dmitry Akhmetov, Hillsboro, OR (US); Laurent Cariou, Milizac (FR); Dibakar Das, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/111,922

(22) Filed: Feb. 21, 2023

(65) Prior Publication Data
US 2023/0247668 A1     Aug. 3, 2023

Related U.S. Application Data

(63) Continuation of application No. 17/081,527, filed on Oct. 27, 2020, now Pat. No. 11,672,010.

(60) Provisional application No. 62/927,284, filed on Oct. 29, 2019.

(51) Int. Cl.
| | |
|---|---|
| *H04W 74/0816* | (2024.01) |
| *H04L 47/28* | (2022.01) |
| *H04W 52/02* | (2009.01) |
| *H04W 84/12* | (2009.01) |

(52) U.S. Cl.
CPC ....... *H04W 74/0816* (2013.01); *H04L 47/286* (2013.01); *H04W 52/0248* (2013.01); *H04W 84/12* (2013.01)

(58) Field of Classification Search
CPC .......... H04W 52/0248; H04W 74/006; H04W 74/0816; H04W 84/12; Y02D 30/70
See application file for complete search history.

(56) References Cited

U.S. PATENT DOCUMENTS

| | | | |
|---|---|---|---|
| 11,516,841 B2 | 11/2022 | Lu et al. | |
| 2016/0037553 A1 | 2/2016 | Attar et al. | |
| 2016/0381704 A1 | 12/2016 | Chu et al. | |
| 2017/0265130 A1* | 9/2017 | Kakani | ............. H04W 52/0219 |
| 2017/0339680 A1* | 11/2017 | Jia | ..................... H04W 52/0216 |

(Continued)

OTHER PUBLICATIONS

"U.S. Appl. No. 17/081,527, 312 Amendment filed Apr. 25, 2023", 3 pgs.

(Continued)

*Primary Examiner* — Pao Sinkantarakorn
(74) *Attorney, Agent, or Firm* — Schwegman Lundberg & Woessner, P.A

(57) ABSTRACT

Embodiments of a beacon interval with boundary time points (BTPs) to improve latency for time sensitive traffic (TST) in Extremely High Throughput (EHT) WLANS are disclosed herein. In some embodiments, a non-access point (AP) station (STA) is configured to decode a beacon frame received from an AP STA. The beacon frame may indicate one or more BTPs within a beacon interval (BI). The non-AP STA may obtain a transmission opportunity (TXOP) for a transmission to the AP STA. The TXOP may be bounded by the one or more BTPs. The non-AP STA may encode a PPDU for transmission to the AP STA during the TXOP.

20 Claims, 2 Drawing Sheets

(56) References Cited

U.S. PATENT DOCUMENTS

| | | | |
|---|---|---|---|
| 2020/0084102 A1* | 3/2020 | Choi | H04W 4/80 |
| 2021/0068094 A1 | 3/2021 | Chen et al. | |
| 2021/0076422 A1 | 3/2021 | Akhmetov et al. | |
| 2021/0127307 A1 | 4/2021 | Huang et al. | |
| 2021/0306955 A1* | 9/2021 | Han | H04W 16/02 |
| 2022/0225323 A1* | 7/2022 | Wang | H04W 72/543 |

OTHER PUBLICATIONS

"U.S. Appl. No. 17/081,527, Non Final Office Action dated Dec. 7, 2022", 11 pgs.

"U.S. Appl. No. 17/081,527, Notice of Allowance dated Feb. 1, 2023", 9 pgs.

"U.S. Appl. No. 17/081,527, Response filed Jan. 4, 2023 to Non Final Office Action dated Dec. 7, 2022", 9 pgs.

U.S. Appl. No. 17/081,527, filed Oct. 27, 2020, Beacon Interval With Boundary Time Points (BTPS) to Improve Latency for Time Sensitive Traffic (TST) in Extremely High Throughout (EHT) WLANS.

* cited by examiner

BEACON INTERVAL WITH BOUNDARY TIME POINTS (BTPs) TO IMPROVE LATENCY FOR TIME SENSITIVE TRAFFIC (TST) IN EXTREMELY HIGH THROUGHOUT (EHT) WLANS

PRIORITY CLAIM

This application is a continuation of U.S. patent application Ser. No. 17/081,527, filed Oct. 27, 2020, which claims the benefit of priority under 35 USC 119(e) to U.S. Provisional Patent Application Ser. No. 62/927,284, filed Oct. 29, 2019 [reference number AC5847-Z] which is incorporated herein by reference in its entirety.

TECHNICAL FIELD

Embodiments pertain to wireless communications. Some embodiments relate to wireless local area networks (WLANs). Some embodiments relate to WLAN communications in accordance with the IEEE 802.11be draft standard (i.e., Extremely High Throughput (EHT)). Some embodiments relate to latency improvement in WLANs.

BACKGROUND

One issue with communicating data over a WLAN is latency. End to end delay is an important key performance indicator in wireless networks. Broad expansion of WLANs and their technological evolution creates new use cases involving transfer of time sensitive traffic such as voice-over-internet protocol (VoIP), video streaming, video conferencing, gaming, etc. In such applications, time sensitive traffic (TST) may require low latency to satisfy user requirements and/or to provide good experience. TST is usually characterized by a predictable traffic pattern such as a fixed interarrival time, and load and packet size. The major contributing factors to high delays are network load (e.g., the more traffic is on air, the less time is for TST to be delivered), contention/collisions (e.g., the more devices is in network, the harder for TST to access the medium), and transmission/duration (e.g., each device in a wireless network can occupy medium for a long time leaving STA with TST no chances to access the medium). These factors may lead to a high, unpredictable end-to-end latency in a wireless network. Thus, there are general needs for latency reduction in WLANs.

DETAILED DESCRIPTION

Figure 1:
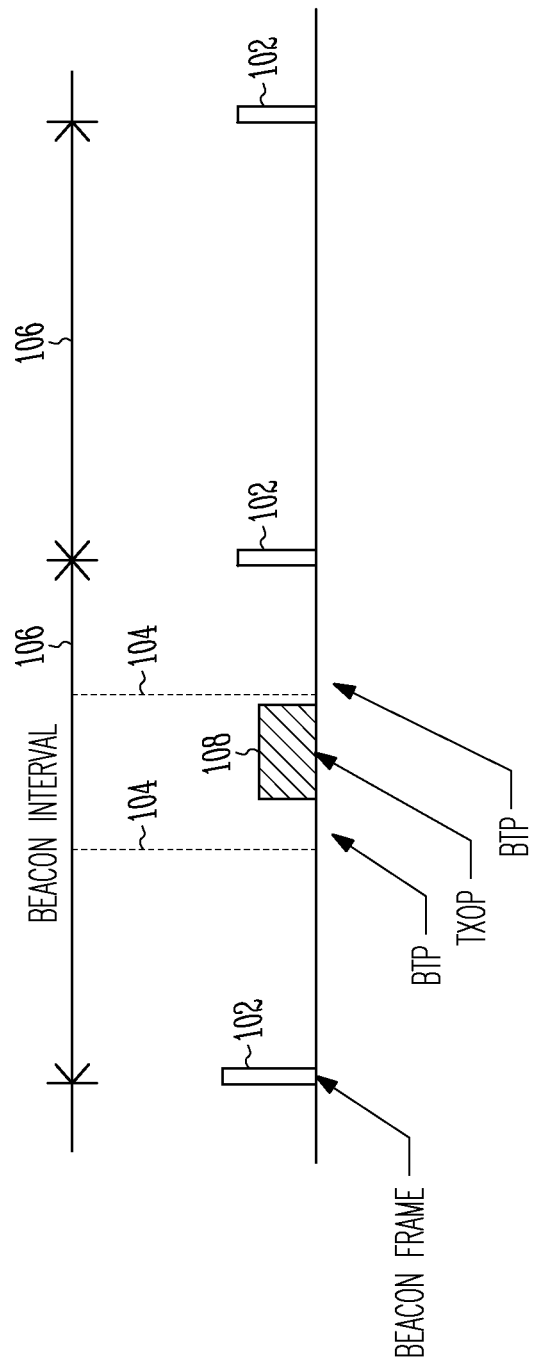
FIG. 1 illustrates a beacon interval including a beacon frame and boundary time points (BTPs) in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A conventional approach to provide required latency is to use various mechanisms, such as prioritization, better control from the access point (AP) side and complicated scheduling. For example, TST traffic may utilize higher access category like AC_VO to contend for the medium while other devices use lower access category like AC_BE. The IEEE 802.11ax standard allows an AP to control channel access using a trigger-based mechanism and multi-user (MU) enhanced distributed channel access (EDCA) parameters set to control channel access within wireless network. An AP may utilize target-wake up time (TWT) scheduling mechanism to control devices transmission opportunities.

While a station (STA) with TST may utilize a higher access category to access the channel, it does not guarantee that this STA always get access. Even more, another device may capture the medium for a long-time preventing STA channel access. An AP may use a trigger frame (TF) to trigger a STA for uplink transmission. In order to do that, the AP may still need to perform contention to access the medium subject to problems above. While TWT is an option, it requires complicated scheduling at AP side and has coexistence issues with the OBSS which may not honor provided TWT schedule Embodiments disclosed herein increase number of contention opportunities for STAs with TST and to provide such devices with more chances to access the medium. These embodiments allow STAs with TST to have improved peak latency which therefore improves the user experience.

Embodiments disclosed herein use Boundary Time Points (BTPs) to address the issues discussed above. In these embodiments, a BTP is a special time point(s) within a beacon interval and may be distributed by an AP in a Beacon frame. AP/STAs may use a BTP as an additional restriction/parameter when organizing TX operation/starting TXOP. In some embodiments, any TXOP or transmission will not extend beyond BTP. Such a restriction may force to stop all devices from a TX/RX operation before a BTP giving more chances for a TST STA to obtain TXOP at a desired time. In these embodiments, devices in the network shall start/resume their backoff after BTP following regular EDCA channel access rules.

Some embodiments provide for an extension for TWT. In these embodiments, enabling BTP at the start of TWT service period (SP) may help prevent other devices in a network from transmitting over the SP. This will increase chances of a device with a negotiated TWT SP to receive data immediately. A TWT STA in Power Save (PS) mode outside of TWT SP will spend less energy in active state to receive pending data.

Some embodiments provide for an extension for Multi-link. In these embodiments, EHT devices with multi-link capabilities may benefit from using BTP in a following way: An EHT AP can synchronize BTP allocation in multiple links to increase chances for synchronized multi-link operation. In such case, an EHT AP or an EHT STA will initiate contention at the same time on multiple links, which increase chances of obtaining medium on more than one at a time and to perform simultaneous synchronized transmission.

FIG. 1 illustrates a beacon interval 106 including a beacon frame 102 and boundary time points (BTPs) 104 in accordance with some embodiments. Embodiments disclosed herein are directed to a beacon interval 106 with boundary time points (BTPs) 104 to improve latency for time sensitive traffic (TST) in Extremely High Throughout (EHT) WLANS.

In some embodiments, a non-access point (AP) station (STA) is configured to decode a beacon frame 102 received from an AP STA. The beacon frame 102 may indicate one or more boundary time points (BTPs) 104 within a beacon interval (BI) 106. The non-AP STA may obtain a transmission opportunity (TXOP) 108 for a transmission to the AP STA. The TXOP 108 may be bounded by the one or more BTPs 104. In these embodiments, the non-AP STA may encode a PPDU for transmission to the AP STA during the TXOP 108.

In accordance with embodiments disclosed herein, the use of BTPs 104 within a beacon interval 106 provide more opportunities to access the medium for STAs by restricting STAs from having TXOP 108 transmissions that extend beyond a BTP 104. This is particularly beneficial for STAs that have tight traffic end-to-end delay constraints. In these embodiments, if the medium is clear at a BTP, a STA (either a non-AP STA or an AP STA) with time sensitive traffic will have more chances of accessing the medium, particularly if the STA uses a higher access category to access the medium. In some embodiments, an AP STA on the other hand may not necessarily be constrained by the BTPs 104. These embodiments are discussed in more detail below.

In some embodiments, the non-AP STA may either start or resume any backoff for channel access after any one or more of the BTPs 104 in accordance with an enhanced distributed channel access (EDCA) channel access procedure.

In some embodiments, the non-AP STA may either start or resume any backoff after any one or more of the BTPs 104 for channel access for time-sensitive traffic (TST) using a higher access category to access the medium (e.g., TST may use higher priority access categories such video and voice traffic). Accordingly, the use of BTPs 104 will allow a STA with TST to have more opportunities to access the medium since other STAs will be prohibited from acquiring the medium for long periods of time that extend beyond a BTP 104.

In some embodiments, a least some of the BTPs 104 may be aligned with target-wake up time (TWT) service periods (SPs) and indicated in a broadcast TWT element (or field) of the beacon frame. Embodiments disclosed herein will help prevent another station from acquiring a TXOP 108 that extends beyond a BTP allowing an AP STA to deliver the scheduled traffic to the STA within the negotiated TWT SP. Without the use of BTPs 104, even if an AP and a STA negotiated a TWT SP, there is no guarantee that another STA may initiate a TXOP 108 just before the announced TWT SP. The initiated TXOP 108 may be long enough to cover the start and/or a substantial part of TWT SP leaving little or no room for the AP to deliver the scheduled traffic to the STA within the negotiated SP.

In some embodiments, when the AP STA is an EHT AP with multi-link capability, and when the non-AP STA is an EHT STA with multi-link capability, the non-AP STA is configured to decode beacon frames received on multiple links. The beacon frames may indicate one or more BTPs 104. In these embodiments, when the BTPs 104 are synchronized by the AP STA on the multiple links, the non-AP STA is configured to synchronize contention for EDCA channel access on the multiple links. In these embodiments, a non-AP STA may initiate or resume contention for EDCA channel access at the same time on the multiple links (e.g., immediately following the BTP on the links).

In some embodiments, the beacon frame 102 may include a BTP field to indicate the locations of the one or more BTPs 104. In these embodiments, the BTP field may include an offset from a start of the beacon interval 106 to indicate a first of the BTPs 104. The field may also include a periodicity flag when the BTP is periodic. In these embodiments, a single BTP field may announce multiple period BTPs 104 with the beacon interval.

In some embodiments, the one or more BTPs 104 may be signaled as part of a broadcast target wake-up time (TWT) field using a reserved bit indicating a start of a service period (SP) that is associated with one of the BTPs 104. In some embodiments, the TXOP 108 is to either end prior to any one of the one or more BTPs 104 or is to start after any one or the one or more BTPs 104. In some embodiments, the AP STA and non-AP STA may be part of a BSS and any TXOPs within a BSS channel may be bounded by the one or more BTPs 104.

Some embodiments are directed to an access point (AP) station (STA). In these embodiments, the AP STA may encode a beacon frame 102 for transmission within a beacon interval (BI) 106. The beacon frame 102 may indicate one or more boundary time points (BTPs) 104. Non-AP STAs associated with the AP STA are to be restricted from obtaining a transmission opportunity (TXOP) extending beyond any of the BTPs 104. In these embodiments, the AP STA may obtain a transmission opportunity (TXOP) 108 for a transmission to a non-AP STA and encode a PPDU for transmission to the non-AP STA during the TXOP.

In some embodiments, the TXOP 108 acquired by the AP STA is not bounded by the one or more BTPs 104. In some embodiments, an AP STA is not necessarily be constrained by the BTPs 104. For example, if an AP obtained a TXOP 108 before a BTP, it may use existing mechanisms such a Trigger frame or a reverse-direction grant (RDG) to solicit data from STAs as the AP is aware of expected time sensitive traffic around an announced BTP point.

In some embodiments, when TXOP 108 acquisition by the AP STA is bounded by the one or more BTPs 104, the AP STA may either start or resume any backoff for channel access after any one or more of the BTPs 104 in accordance with an enhanced distributed channel access (EDCA) channel access procedure.

Figure 2:
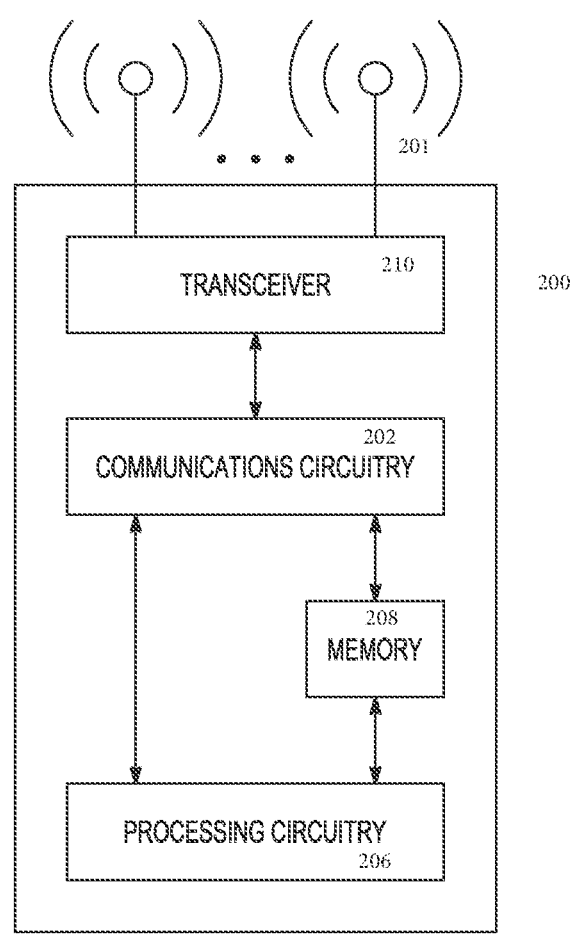
FIG. 2 is a functional block diagram of a wireless communication station (STA) in accordance with some embodiments.

FIG. 2 is a functional block diagram of a wireless communication station (STA) in accordance with some embodiments. In some embodiments, FIG. 2 illustrates a functional block diagram of a communication station that may be suitable for use as an AP STA or non-AP STA. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

In some embodiments, an AP and STA may operate in accordance with one or more of the IEEE 802.11 standards. The IEEE draft specification IEEE P802.11ax/D4.3, is incorporated herein by reference in its entirety.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high throughput (EHT) non-access point station (EHT STA), the apparatus comprising: processing circuitry; and memory, the processing circuitry configured to:
    decode a management frame from an EHT access point station (EHT AP) that includes a broadcast target wake time (TWT) element, the management frame announcing a TWT service period (SP) (TWT-SP) with restrictions to prioritize delivery of latency sensitive traffic,
    wherein when the EHT STA is scheduled by the EHT AP for traffic delivery during the TWT-SP with restrictions, the processing circuitry is configured to:
    prioritize delivery of frames comprising the latency sensitive traffic during the TWT-SP with restrictions;
    use enhanced medium access for the delivery of latency sensitive traffic during the TWT-SP with restrictions; and
    ensure that any transmission opportunity (TXOP) ends before a start time of the TWT-SP with restrictions.

2. The apparatus of claim 1, when the EHT STA is scheduled by the EHT AP for traffic delivery during the TWT-SP with restrictions, the processing circuitry is configured to decode a trigger frame received from the EHT AP that triggers transmission of the frames comprising the latency sensitive traffic during the TWT-SP with restrictions.

3. The apparatus of claim 2, wherein the management frame is a beacon frame.

4. The apparatus of claim 3, wherein when the EHT STA is scheduled by the EHT AP for traffic delivery during the TWT-SP with restrictions, during the TWT-SP with restrictions, the processing circuitry is configured to suspend decrementing a backoff counter for other traffic until the EHT STA has delivered the frames comprising the latency sensitive traffic.

5. The apparatus of claim 4, wherein the start time of the TWT-SP with restrictions is indicated in the broadcast TWT element.

6. The apparatus of claim 5, wherein before starting a transmission, the processing circuitry is configured to check if there is enough time for a frame exchange to complete prior to the start time of the TWT SP with restrictions, and
    wherein when there is not enough time to complete the frame exchange, the processing circuitry is configured to configure the EHT STA defer the transmission until after the TWT SP with restrictions.

7. The apparatus of claim 6, wherein when the broadcast TWT element comprises restricted TWT parameters, the broadcast TWT element comprises a restricted TWT (R-TWT) element and the TWT-SP with restrictions comprises a restricted TWT service period (R-TWT SP).

8. The apparatus of claim 4, wherein when the EHT STA and the EHT AP have multi-link capability and are operating as multi-link devices (MLDs), the processing circuitry is configured to decode signalling from the EHT AP that indicates a restriction on transmissions on other links during the TWT-SP with restrictions.

9. The apparatus of claim 4, wherein the TWT-SP with restrictions is indicated with one or more boundary time points within a beacon interval.

10. The apparatus of claim 4, wherein the memory is configured to store the management frame, and
wherein the processing circuitry comprises a baseband processor.

11. A non-transitory computer-readable storage medium that stores instructions for execution by processing circuitry of an extremely high throughput (EHT) non-access point station (EHT STA), the processing circuitry configured to:
decode a management frame from an EHT access point station (EHT AP) that includes a broadcast target wake time (TWT) element, the management frame announcing a TWT service period (SP) (TWT-SP) with restrictions to prioritize delivery of latency sensitive traffic,
wherein when the EHT STA is scheduled by the EHT AP for traffic delivery during the TWT-SP with restrictions, the processing circuitry is configured to:
prioritize delivery of frames comprising the latency sensitive traffic during the TWT-SP with restrictions;
use enhanced medium access for the delivery of latency sensitive traffic during the TWT-SP with restrictions; and
ensure that any transmission opportunity (TXOP) ends before a start time of the TWT-SP with restrictions.

12. The non-transitory computer-readable storage medium of claim 11, when the EHT STA is scheduled by the EHT AP for traffic delivery during the TWT-SP with restrictions, the processing circuitry is configured to decode a trigger frame received from the EHT AP that triggers transmission of the frames comprising the latency sensitive traffic during the TWT-SP with restrictions.

13. The non-transitory computer-readable storage medium of claim 12, wherein the management frame is a beacon frame.

14. The non-transitory computer-readable storage medium of claim 13, wherein when the EHT STA is scheduled by the EHT AP for traffic delivery during the TWT-SP with restrictions, during the TWT-SP with restrictions, the processing circuitry is configured to suspend decrementing a backoff counter for other traffic until the EHT STA has delivered the frames comprising the latency sensitive traffic.

15. The non-transitory computer-readable storage medium of claim 14, wherein the start time of the TWT-SP with restrictions is indicated in the broadcast TWT element.

16. The non-transitory computer-readable storage medium of claim 15, wherein before starting a transmission, the processing circuitry is configured to check if there is enough time for a frame exchange to complete prior to the start time of the TWT SP with restrictions, and
wherein when there is not enough time to complete the frame exchange, the processing circuitry is configured to configure the EHT STA defer the transmission until after the TWT SP with restrictions.

17. The non-transitory computer-readable storage medium of claim 16, wherein when the broadcast TWT element comprises restricted TWT parameters, the broadcast TWT element comprises a restricted TWT (R-TWT) element and the TWT-SP with restrictions comprises a restricted TWT service period (R-TWT SP).

18. The non-transitory computer-readable storage medium of claim 14, wherein when the EHT STA and the EHT AP have multi-link capability and are operating as multi-link devices (MLDs), the processing circuitry is configured to decode signalling from the EHT AP that indicates a restriction on transmissions on other links during the TWT-SP with restrictions.

19. An apparatus of an extremely high throughput (EHT) access point station (EHT AP), the apparatus comprising: processing circuitry; and memory, the processing circuitry configured to:
encode a management frame for transmission to a non-AP EHT station (EHT STA), the management frame including a broadcast target wake time (TWT) element, the management frame announcing a TWT service period (SP) (TWT-SP) with restrictions to allow the EHT STA to prioritize delivery of latency sensitive traffic; and
encode a trigger frame for transmission to the EHT STA to trigger transmission of the frames comprising the latency sensitive traffic during the TWT-SP with restriction,
wherein the EHT AP is configured to ensure that any transmission opportunity (TXOP) ends before a start time of the TWT-SP with restrictions.

20. The apparatus of claim 19, wherein the management frame is a beacon frame,
wherein the start time of the TWT-SP with restrictions is indicated in the broadcast TWT element, and
wherein when the broadcast TWT element comprises restricted TWT parameters, the broadcast TWT element comprises a restricted TWT (R-TWT) element and the TWT-SP with restrictions comprises a restricted TWT service period (R-TWT SP).

* * * * *